United States Patent
Daher Adegas et al.

(10) Patent No.: US 11,022,100 B2
(45) Date of Patent: Jun. 1, 2021

(54) SYSTEM AND METHOD FOR CONTROLLING WIND TURBINES

(71) Applicant: General Electric Company, Schenectady, NY (US)

(72) Inventors: Fabiano Daher Adegas, Bayern (DE); Sara Simonne L. Delport, Bayern (DE); Carlo Luigi Bottasso, Monza (IT); Stefano Cacciola, Gorgonzola (IT)

(73) Assignee: General Electric Company, Schenectady, NY (US)

( * ) Notice: Subject to any disclaimer, the term of this patent is extended or adjusted under 35 U.S.C. 154(b) by 940 days.

(21) Appl. No.: 14/972,981

(22) Filed: Dec. 17, 2015

(65) Prior Publication Data

US 2017/0175709 A1 Jun. 22, 2017

(51) Int. Cl.
*F03D 7/04* (2006.01)
*F03D 7/02* (2006.01)

(52) U.S. Cl.
CPC .......... *F03D 7/045* (2013.01); *F03D 7/0224* (2013.01); *F03D 7/047* (2013.01); *F03D 7/048* (2013.01); *F05B 2220/30* (2013.01); *F05B 2240/60* (2013.01); *F05B 2270/101* (2013.01); *F05B 2270/304* (2013.01); *F05B 2270/32* (2013.01); *F05B 2270/331* (2013.01)

(58) Field of Classification Search
CPC ................................ F03D 7/045; F03D 7/048
See application file for complete search history.

(56) References Cited

U.S. PATENT DOCUMENTS

| 4,297,076 | A | * | 10/1981 | Donham | ............... F03D 7/0228 416/24 |
| 5,155,375 | A | | 10/1992 | Holley | |
| 5,289,041 | A | | 2/1994 | Holley | |
| 7,004,724 | B2 | * | 2/2006 | Pierce | ................... F03D 7/0204 415/118 |
| 7,317,260 | B2 | | 1/2008 | Wilson | |

(Continued)

FOREIGN PATENT DOCUMENTS

| EP | 2494192 B1 | 8/2013 |
| KR | 101466082 B1 | 11/2014 |

OTHER PUBLICATIONS

C.L. Bottasso and A. Croce, Cascading Kalman Observers of Structural Flexible and Wind States for Wind Turbine Control, Scientific Report DIA-SR 09-02, Jan. 2009, pp. 1-17, Dipartimento di Ingegneria Aerospaziale, Politecnico di Milano, Milano, Italy.

(Continued)

*Primary Examiner* — Justin D Seabe
*Assistant Examiner* — Michael L Sehn
(74) *Attorney, Agent, or Firm* — Dority & Manning, P.A.

(57) ABSTRACT

A control system for a wind turbine is provided. The wind turbine includes at least one stationary component. The control system includes at least one mechanical load measurement sensor coupled to the at least one stationary component. The system also includes at least one modeling device configured to generate and transmit at least one wind turbine regulation device command signal to at least one wind turbine regulation device to regulate operation of the wind turbine based upon at least one wind inflow parameter.

18 Claims, 6 Drawing Sheets

(56) References Cited

U.S. PATENT DOCUMENTS

| | | | |
|---|---|---|---|
| 7,445,431 | B2 | 11/2008 | Larsen et al. |
| 7,909,575 | B2 | 3/2011 | Barbu et al. |
| 7,954,372 | B2 | 6/2011 | Brath et al. |
| 8,096,762 | B2 | 1/2012 | Risager et al. |
| 8,162,608 | B2 * | 4/2012 | Birkemose ............ F03D 7/0204 416/1 |
| 8,319,364 | B2 | 11/2012 | Nakayama |
| 8,434,996 | B2 * | 5/2013 | Bagepalli ............ G01M 5/0016 415/14 |
| 9,014,863 | B2 | 4/2015 | Olesen |
| 2011/0311359 | A1 * | 12/2011 | Bjork .................... F03D 7/0204 416/1 |
| 2012/0133138 | A1 * | 5/2012 | Sorensen ................ F03D 7/028 290/44 |
| 2012/0211986 | A1 | 8/2012 | Bertolotti et al. |
| 2013/0114067 | A1 * | 5/2013 | Belen, Jr. ................ G01W 1/00 356/28.5 |
| 2014/0030090 | A1 * | 1/2014 | Kammer .................... F03D 7/00 416/1 |
| 2014/0377064 | A1 | 12/2014 | Kristoffersen et al. |

OTHER PUBLICATIONS

C.L. Bottasso and C.E.D. Riboldi, Estimation of wind misalignment and vertical shear from blade loads, Renewable Energy, Feb. 2014, pp. 293-302, vol. 62, Science Direct, Elsevier.

Mahmoud Etemaddar, Zhen Gao, and Torgeir Moan, Structural Load Analysis of a Wind Turbine under Pitch Actuator and Controller Faults, Journal of Physics: Conference Series, Dec. 16, 2014, pp. 1-10, vol. 555 Conference 1, IOP Publishing Ltd., Bristol, UK.

C.L. Bottasso and C.E.D. Riboldi, Validation of a wind misalignment observer using field test data, Renewable Energy, Feb. 2015, pp. 298-306, vol. 74, Science Direct, Elsevier.

* cited by examiner

SYSTEM AND METHOD FOR CONTROLLING WIND TURBINES

BACKGROUND

The field of the disclosure relates to wind turbines, and more particularly to a system and method for controlling wind turbines based upon mechanical load measurements and wind turbine operational data.

Most known wind turbine generators include a rotor having multiple blades. The rotor is sometimes coupled to a housing, or nacelle, that is positioned on top of a base, for example, a tubular tower. At least some known utility grade wind turbines, i.e., wind turbines designed to provide electrical power to a utility grid have rotor blades having predetermined shapes and dimensions. The rotor blades transform kinetic wind energy into induced blade aerodynamic forces that further induce a mechanical rotational torque that drives one or more generators, subsequently generating electric power. A plurality of wind turbine generators in a localized geographic array is typically referred to as a wind farm or a wind park.

Wind turbines are exposed to large variations in wind inflow, which exerts varying loads to the wind turbine structure, particularly the wind turbine rotor and shaft. Real-time estimates of wind inflow conditions on a wind turbine can be used to control the wind turbine to increase power performance and annual energy production and reduce mechanical loads. The inflow estimates can, for example, be used to predict turbine wake length and strength with greater accuracy, enabling better turbine control and increased power performance. Real-time estimates of the wind inflow conditions can also be used to reduce wind turbine noise and increase the accuracy in predicting wind turbine noise under different inflow conditions. The ability to estimate noise emission with greater accuracy allows wind turbines to more closely approach, but not exceed, the noise limitations imposed by regulations.

Known approaches have been employed to address the issue of measuring wind inflow conditions on a wind turbine. One such approach is to deduce wind inflow conditions by using rotor blade sensors to measure flow properties proximate to the surface of each rotor blade. Another approach is to use Light Detection and Ranging (LiDAR) sensors installed on the turbine rotor blades, spinner, or nacelle. However, these sensors are costly and their performance is subject to weather conditions.

BRIEF DESCRIPTION

In one aspect, a control system for a wind turbine is provided. The wind turbine includes at least one stationary component. The control system includes at least one mechanical load measurement sensor coupled to the at least one stationary component. The control system further includes at least one wind turbine regulation device configured to regulate operation of the wind turbine as a function of at least one wind inflow parameter. The control system also includes at least one modeling device coupled to the at least one mechanical load measurement sensor and the at least one wind turbine regulation device. The at least one modeling device is configured to receive at least one mechanical load measurement signal from the at least one mechanical load measurement sensor coupled to the at least one stationary component. The at least one modeling device is further configured to generate the at least one wind inflow parameter based on the at least one mechanical load measurement signal. The at least one modeling device is also configured to generate at least one wind turbine regulation device command signal based on the at least one wind inflow parameter. The at least one modeling device is further configured to transmit the at least one wind turbine regulation device command signal to the at least one wind turbine regulation device to regulate operation of the wind turbine.

In another aspect, a method for controlling a wind turbine is provided. The wind turbine includes at least one stationary component. The wind turbine further includes at least one mechanical load measurement sensor coupled to the at least one stationary component. The wind turbine also includes at least one wind turbine regulation device. The wind turbine further includes at least one modeling device coupled to the at least one mechanical load measurement sensor and the at least one wind turbine regulation device. The method includes receiving, by the modeling device, at least one mechanical load measurement signal from the at least one mechanical load measurement sensor. The method further includes generating, by the modeling device, at least one wind inflow parameter based on the at least one mechanical load measurement signal. The method also includes generating, by the modeling device, at least one wind turbine regulation device command signal based on the at least one wind inflow parameter. The method further includes transmitting, by the modeling device, the at least one wind turbine regulation device command signal to the at least one wind turbine regulation device to regulate operation of the wind turbine.

In a further aspect, a wind turbine park is provided. The wind turbine park includes a plurality of wind turbines including an operating wind turbine. At least one wind turbine includes at least one stationary component. The at least one wind turbine further includes at least one mechanical load measurement sensor coupled to the at least one stationary component. The at least one wind turbine also includes at least one wind turbine regulation device configured to regulate operation of the at least one wind turbine as a function of at least one wind inflow parameter. The at least one wind turbine further includes at least one modeling device coupled to the at least one mechanical load measurement sensor and the at least one wind turbine regulation device. The at least one modeling device is configured to receive at least one mechanical load measurement signal from the at least one mechanical load measurement sensor. The at least one modeling device is further configured to generate the at least one wind inflow parameter based on the at least one mechanical load measurement signal. The at least one modeling device is also configured to generate at least one wind turbine regulation device command signal based on the at least one wind inflow parameter. The at least one modeling device is further configured to transmit the at least one wind turbine regulation device command signal to the at least one wind turbine regulation device to regulate operation of the wind turbine park.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The wind turbine control systems described herein provide a method for estimating real-time wind inflow conditions using sensors in a fixed frame of a wind turbine to regulate operation of the wind turbine. Specifically, the embodiments described herein include a wind turbine control system that is configured to control the operation of the wind turbine partially using mechanical load measurements from sensors in a fixed frame of the wind turbine. In alternative embodiments, the wind turbine control system is further configured to control the operation of the wind turbine based on one or more of wind turbine operational data measurements, atmospheric conditions, and blade pitch angle measurements.

An exemplary embodiment of the wind turbine control system for a wind turbine includes at least one mechanical load measurement sensor, at least one wind turbine regulation device, and at least one wind observation modeling (WOM) computing device. The wind turbine includes at least one stationary component. The mechanical load measurement sensor is coupled to the stationary component. The WOM computing device is coupled to the mechanical load measurement sensor and the wind turbine regulation device. The WOM computing device is configured to receive at least one mechanical load measurement signal from the mechanical load measurement sensor. The WOM computing device is configured to estimate wind inflow conditions using the mechanical load measurement signal. Based upon the estimated wind inflow conditions, the WOM computing device is further configured to generate at least one wind inflow parameter. The WOM computing device is further configured to generate at least one wind turbine regulation device command signal based on the wind inflow parameter. The WOM computing device is further configured to transmit the wind turbine regulation device command signal to the wind turbine regulation device to regulate operation of the wind turbine based upon the wind inflow parameter.

In some embodiments, the wind turbine control system further includes at least one blade pitch angle sensor. The WOM computing device is configured to receive at least one blade pitch angle signal from the blade pitch angle sensor to generate, with the mechanical load measurement signal, the at least one wind inflow parameter. The WOM computing device is further configured to generate the wind turbine regulation device command signal based on the wind inflow parameter to transmit to the wind turbine regulation device.

In additional embodiments, the wind turbine control system further includes at least one atmospheric condition measurement sensor. The WOM computing device is configured to receive at least one atmospheric condition measurements signal from the atmospheric condition measurement sensor to generate, with the mechanical load measurement signal, the at least one wind inflow parameter. The WOM computing device is further configured to generate the wind turbine regulation device command signal based on the wind inflow parameter to transmit to the wind turbine regulation device.

In still additional embodiments, the wind turbine control system further includes at least one wind turbine operational data sensor. The WOM computing device is configured to receive at least one wind turbine operational data signal from the wind turbine operational data sensor to generate, with the mechanical load measurement signal, the at least one wind inflow parameter. The WOM computing device is further configured to generate the wind turbine regulation device command signal based on the wind inflow parameter to transmit to the wind turbine regulation device.

In the exemplary embodiment, one or more of the mechanical load measurement signal, the wind turbine operational data signal, the atmospheric condition measurements signal, or the blade pitch angle signal are used to generate the at least one wind inflow parameter.

Figure 1:
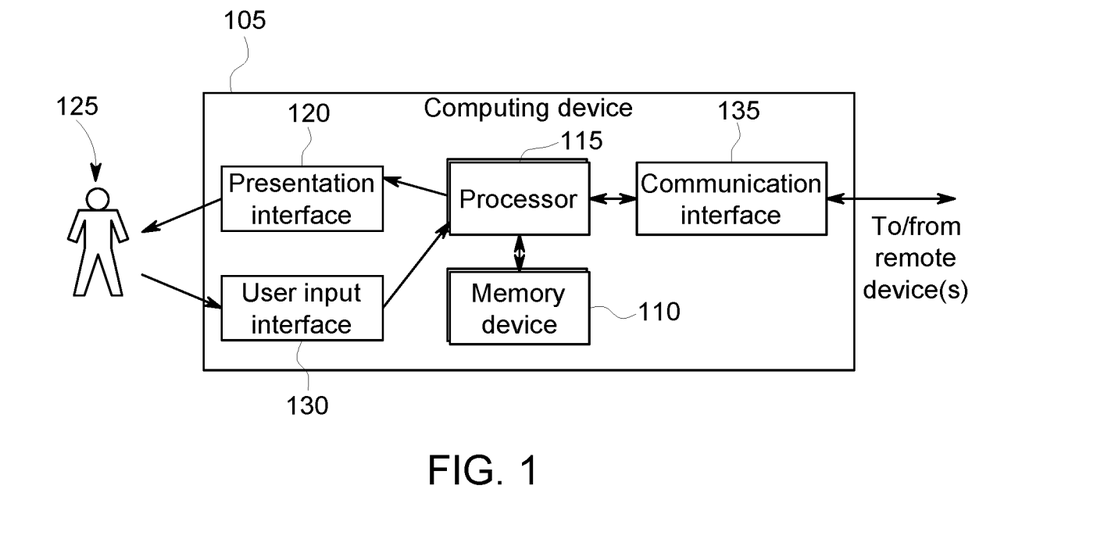
FIG. 1 is a block diagram of an exemplary computing device.

FIG. 1 is a block diagram of an exemplary computing device 105 used to facilitate operation of a wind turbine (not shown in FIG. 1) through a wind turbine control system (not shown in FIG. 1). More specifically, computing device 105 estimates wind inflow conditions and/or generates a wind observation model based upon mechanical load measurements, atmospheric condition measurements, wind turbine operational data measurements, and/or blade pitch angle measurements. In the exemplary embodiment, computing device 105 is the wind observation modeling (WOM) computing device. Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 may be configured to store measurements including, without limitation, atmospheric condition measurements, wind turbine operational data, mechanical load measurements, blade pitch angle measurements, and/or any other type data. Also, memory device 110 includes, without limitation, sufficient data, algorithms, and commands to facilitate generating physics-based and/or data-driven models of wind inflow conditions associated with a wind turbine and use the models to generate wind inflow parameters to regulate the wind turbine.

In some embodiments, computing device 105 includes a presentation interface 120 coupled to processor 115. Presentation interface 120 presents information, such as a user interface, to a user 125. In some embodiments, presentation interface 120 includes one or more display devices and presents measurement data and/or wind inflow parameters to user 125 using a human machine interface (HMI) (not shown in FIG. 1). Also, in some embodiments, computing device 105 includes a user input interface 130. In the exemplary embodiment, user input interface 130 is coupled to processor 115 and receives input from user 125.

A communication interface 135 is coupled to processor 115 and is configured to be coupled in communication with one or more other devices, such as a sensor, a wind turbine control device, or another computing device 105, and to perform input and output operations with respect to such devices while performing as an input channel. Communication interface 135 receives data from and/or transmits data to one or more remote devices. For example, a communication interface 135 of one computing device 105 transmits a signal to the communication interface 135 of another computing device 105. In some embodiments, communication interface 135 is a wireless interface.

Computing device 105 is used to facilitate operation of a plurality of wind turbines (not shown in FIG. 1) through a wind turbine park control system (not shown in FIG. 1). In some embodiments, computing device 105 also includes sufficient computer-readable/executable instructions, data structures, program modules, and program sub-modules, to receive other data associated with measured values from other wind turbines and wind turbine systems to facilitate overall operation of the wind turbine park.

Figure 2:
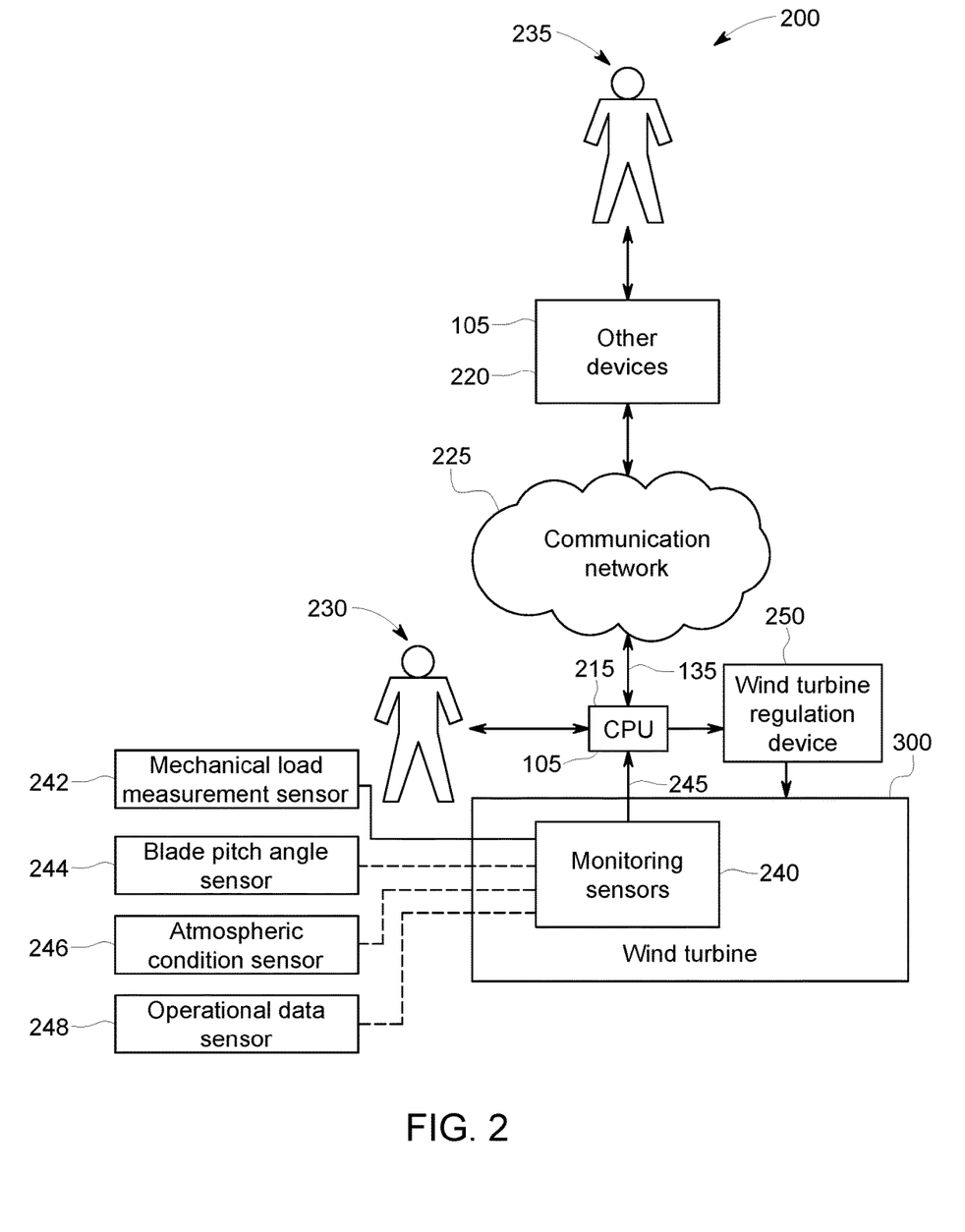
FIG. 2 is a block diagram of a portion of an exemplary wind turbine control system that include the computing device shown in FIG. 1.

FIG. 2 is a block diagram of a portion of a wind turbine control system 200 that is used to monitor and control at least a portion of a wind turbine 300. In some embodiments, wind turbine control system 200 also includes sufficient computer-readable/executable instructions, data structures, program modules, and program sub-modules, to receive other data associated with measured values from other wind turbine systems to facilitate overall operation of wind turbine 300. Alternatively, wind turbine control system 200 is a stand-alone system. Further, alternatively, wind turbine control system 200 is any computer-based system that monitors portions of, and generates a wind inflow model for wind turbine 300. In the exemplary embodiment, wind turbine control system 200 includes at least one central processing unit (CPU) 215 configured to execute monitoring algorithms and monitoring logic. CPU 215 is coupled to other devices 220 via a network 225. In some embodiments, network 225 is a wireless network.

Referring to FIGS. 1 and 2, CPU 215 is a computing device 105. In the exemplary embodiment, computing device 105 is coupled to network 225 via communication interface 135. In an alternative embodiment, CPU 215 is integrated with other devices 220.

CPU 215 interacts with a first operator 230, e.g., without limitation, via user input interface 130 and/or presentation interface 120. In one embodiment, CPU 215 presents information about wind turbine 300, such as measured blade pitch positions, to operator 230. Other devices 220 interact with a second operator 235, e.g., without limitation, via user input interface 130 and/or presentation interface 120. For example, other devices 220 presents operational information to second operator 235. As used herein, the term "operator" includes any person in any capacity associated with operating and maintaining wind turbine 300, including, without limitation, shift operations personnel, maintenance technicians, and facility supervisors.

In the exemplary embodiment, wind turbine 300 includes one or more monitoring sensors 240 coupled to CPU 215 through at least one input channel 245. Monitoring sensors 240 collect measurements including, without limitation, the rotor load measurements and the blade pitch angle measurements emanating from portions of wind turbine 300. Monitoring sensors 240 also collect other measurements including, without limitation, the atmospheric measurements and the operational data measurements in portions of wind turbine 300. Monitoring sensors 240 repeatedly, e.g., periodically, continuously, and/or upon request, transmit measurement readings at the time of measurement. CPU 215 receives and processes the measurement readings. Such data is transmitted across network 225 and is accessed by any device capable of accessing network 225 including, without limitation, desktop computers, laptop computers, and personal digital assistants (PDAs) (neither shown).

At least one mechanical load measurement sensor 242 (only one shown in FIG. 2) is located in, within, on, or otherwise attached to, at least one stationary component of wind turbine 300. The at least one stationary component may be a flange, a main bearing, a rotor hub, a rotor shaft, a main bearing housing, and a yaw bearing, or any means of asymmetric load measurements in a fixed coordinate system. Mechanical load measurement sensor 242 produces sensor-signals dependent on mechanical load characteristics of wind turbine 300 that are transmitted to CPU 215. The mechanical load characteristics include, but are not limited to, bending moments at a rotor shaft, torsional moments at the rotor shaft, bending moments at a tower top and/or base, and torsional moments at the tower top and/or base. Mechanical load measurement sensor 242 repeatedly, e.g., periodically, continuously, and/or upon request, transmits measurement readings at the time of measurement. For example, in one embodiment, the set of measurements are obtained every 0.1 seconds for a time window of 5 seconds. Alternatively, any number of measurements, any interval time, and any time window are established that enable operation of wind turbine 300 and wind turbine control system 200 as described above.

In some embodiments, a plurality of mechanical load measurement sensors 242 (only one shown in FIG. 2) measure a set of mechanical loads. Each mechanical load measurement has a measured value of a mechanical load characteristic as described above.

Where the wind turbine is equipped with an individual blade control mechanism for controlling a pitch angle of each rotor blade, at least one blade pitch angle measurement is transmitted to CPU 215 from at least one blade pitch angle sensor 244 (only one shown in FIG. 2). Blade pitch angle sensor 244 repeatedly, e.g., periodically, continuously, and/or upon request, transmits measurement readings at the time of measurement. Alternatively, any number of measurements, any interval time, and any time window are established that enable operation of wind turbine 300 and wind turbine control system 200 as described above.

In some embodiments, a plurality of blade pitch angle sensors 244 (only one shown in FIG. 2) measure a set of blade pitch angles. Each blade pitch angle measurement has a measured value of a blade pitch angle as described above.

CPU 215 is configured to generate per-rotor revolution (nP) harmonic load components and per-rotor revolution (nP) harmonic pitch angle components from the mechanical load measurements and the blade pitch angle measurements. CPU 215 uses the harmonic components to generate wind flow parameters used to regulate the wind turbine.

In the example embodiment, nP harmonic load amplitudes are computed from the mechanical load measurements via a demodulation operation at azimuth angle $\psi(t)$. The following approximation of a time-varying, almost-periodic load signal $\alpha(t)$, is given by $$a(t)=a(\psi(t))\approx a_k^T s(\psi(t)) \qquad \text{Eq. (1)}$$

where $s(\psi(t))$ is a vector of harmonic basis given by $$s(\psi(t))=(1,\ldots,\sin(n\psi(t)),\cos(n\psi(t)),\ldots)^T, n=(1,N_H) \qquad \text{Eq. (2)}$$

where $N_H$ is a higher nP harmonic component contained in the expression. nP is an n-per-revolution frequency, 1P (i.e., where n=1) is the fundamental frequency, and 2P, 3P, 4P, and so on, are harmonics of the fundamental frequency 1P. 0P is 0-per-revolution frequency. A 0P component of a signal comprises a constant or DC value over one period. The 0P component of an almost periodic signal is an average over the demodulation window. A superscript notation 'T' is the vector or matrix transpose operator.

The harmonic amplitudes over the K-th demodulation window $\psi(t) \in [\psi_K - 2\pi N_R, \psi_K]$ are $$a_K^T = (a_K^O, \ldots, a_K^{n,s}, a_K^{n,c}, \ldots) \qquad \text{Eq. (3)}$$

where $a_K^O$ denotes an 0P component, $a_K^{n\ s}$ and $a_K^{n\ c}$ denote the sin and cos components of the nP harmonic frequency, and $N_R$ represent the number of rotor revolutions over which the load signal $\alpha(t)$ is measured. Superscript notation 'S' and 'C' are shorthand notations for sin and cos used as superscript to relate the harmonic amplitudes to its respective harmonic base $\sin(i\psi)$ or $\cos(i\psi)$ respectively. Subscript notation 'K' is the K-th demodulation window $\psi(t) \in [\psi_K - 2\pi N_R, \psi_K]$, K=1, 2, 3, . . . . . Constant (0P) and harmonic amplitudes are computed by projection based on the azimuth angle $\psi(t)$, such as, $$a_K^0 = \frac{1}{2\pi N_R} \int_{\psi_K - 2\pi N_R}^{\psi_K} a(\psi) d\psi \qquad \text{Eq. (4)}$$

$$a_K^{i,s} = \frac{1}{\pi N_R} \int_{\psi_K - 2\pi N_R}^{\psi_K} a(\psi)\sin(i\psi) d\psi \qquad \text{Eq. (5)}$$

$$a_K^{i,c} = \frac{1}{\pi N_R} \int_{\psi_K - 2\pi N_R}^{\psi_K} a(\psi)\cos(i\psi) d\psi \qquad \text{Eq. (6)}$$

In one embodiment, the load signal $\alpha(t)$ is nodding moment measurements and/or yawing moment measurements. Nodding and yawing moments are a particular load measurement on a stationary component of the wind turbine.

Where pitch angle measurements are taken in a rotating frame, Coleman transformations are applied to the load signals to bring them to a fixed frame to estimate inflow properties defined in the fixed frame. The Coleman transformation is defined as, $$\begin{pmatrix} \beta_d \\ \beta_q \\ \beta_0 \end{pmatrix} = \frac{2}{3} \begin{bmatrix} \cos(n\psi) & \cos\left(n\left(\psi + \frac{2\pi}{3}\right)\right) & \cos\left(n\left(\psi + \frac{4\pi}{3}\right)\right) \\ \sin(n\psi) & \sin\left(n\left(\psi + \frac{2\pi}{3}\right)\right) & \sin\left(n\left(\psi + \frac{4\pi}{3}\right)\right) \\ \frac{1}{2} & \frac{1}{2} & \frac{1}{2} \end{bmatrix} \begin{pmatrix} \beta_1 \\ \beta_2 \\ \beta_3 \end{pmatrix} \quad \text{Eq. (7)}$$

where $\beta_{1 \ldots 3}$ are the individual pitch angle signals, $\psi$ is the rotor azimuth angle, n represents per-revolution harmonics to be computed, and $\beta_d$, $\beta_q$ and $\beta_o$ are the resulting pitch angle components. In order to extract the harmonic pitch angle amplitudes, the same demodulation algorithms shown for load signals are applied to the pitch signals $\beta_d$ and $\beta_q$.

The pitch angle signals are converted from a rotating frame to a fixed frame because pitch angles are expressed in rotating frames attached to individual blades. The transformation to the fixed frame enables a representation of a combined effect of all rotor blades, not the individual blades, by three quantities $\beta_d$, $\beta_q$, and $\beta_0$. When the wind turbine is equipped with individual pitch control, the quantities $\beta_d$ and $\beta_q$ change the asymmetric loads on the rotor and therefore complement the load information with regards to wind inflow.

The harmonic load amplitudes and the harmonic pitch angle amplitudes in the stationary frame can be updated at runtime using the algorithms above.

In one or more embodiments, the wind turbine control system 200 includes at least one atmospheric condition measurement sensor 246 (only one shown in FIG. 2) configured to measure at least one atmospheric condition and transfer data associated with the detected at least one atmospheric condition to CPU 215. Measuring the at least one atmospheric condition includes, but not limited to, detecting air density, an ambient air pressure, an ambient air temperature, an ambient humidity, a rate of rain fall, and/or other ambient atmospheric conditions using the at least one atmospheric condition measurement sensor. In the example embodiment, the at least one atmospheric condition measurement sensor 246 is positioned on, or in close proximity to, wind turbine 300. The at least one atmospheric condition measurement sensor 246 repeatedly, e.g., periodically, continuously, and/or upon request, transmits measurement readings at the time of measurement. Alternatively, any number of measurements, any interval time, and any time window are established that enable operation of wind turbine 300 and wind turbine control system 200 as described above.

In some embodiments, a plurality of atmospheric condition measurement sensors 246 (only one shown in FIG. 2) measure a set of atmospheric conditions. Each atmospheric condition measurement point has a measured value of an atmospheric condition described above.

In one or more embodiments, wind turbine control system 200 includes at least one operational data sensor 248 (only one shown in FIG. 2) for measuring at least one operational data point associated with an operation of wind turbine 300 and transfer data associated with the detected at least one operational data measurement to CPU 215. The at least one wind turbine operation measured by the at least one operational data sensor includes, but is not limited to, torque on a rotor shaft, power generated by the wind turbine, rotational speed of the wind turbine, bending stress values of a rotor shaft, wind direction, wind speed, rotor speed, output voltage, output current of a turbine generator, turbine blades pitch angles, rotational speed of a turbine generator, a yaw of the wind turbine, and power generated by the wind turbine. In the example embodiment, the at least one operational data sensor 248 is positioned on, or in close proximity to, the wind turbine. The at least one operational data sensor repeatedly, e.g., periodically, continuously, and/or upon request, transmits measurement readings at the time of measurement. Alternatively, any number of measurements, any interval time, and any time window are established that enable operation of wind turbine 300 and wind turbine control system 200 as described above.

In some embodiments, a plurality of operational data sensors 248 (only one shown in FIG. 2) measure a set of operational data points. Each operational data measurement has a measured value of a wind turbine operation described above.

In the exemplary embodiment, CPU 215 is configured to receive at least one mechanical load measurement signal from mechanical load measurement sensor 242. In additional embodiments, CPU 215 is further configured to receive at least one wind turbine operational data signal from wind turbine operational data sensor 248. In further embodiments, CPU 215 is configured to receive at least one blade pitch angle signal from blade pitch angle sensor 244. In still further embodiments, CPU 215 is configured to receive at least one atmospheric condition measurement signal from atmospheric condition measurement sensor 246.

CPU 215 is further configured to generate, based upon one or more of the harmonic load components, the harmonic pitch angle components, the turbine operational data measurements, and the atmospheric condition measurements, a wind observation model representing a structure of a wind inflow field acting on the wind turbine. A structure of the wind observation model may comprise a static or a dynamical model relating the nP load harmonic components and the nP pitch angle harmonic components stacked in an input vector $\overline{m}$ to wind inflow parameters contained in an output vector φ.

$$\overline{\dot{x}} = A(\theta)\overline{x} + B_m(\theta)\overline{m} + B_q(\theta)q + d(\theta) \quad \text{Eq. (8)}$$

$$\varphi = C(\theta)\overline{x} + D_m(\theta)\overline{m} + D_q(\theta)q + e(\theta) \quad \text{Eq. (9)}$$

A yaw rate input q accounts for gyroscopic corrections during a yawing maneuver. System matrices A, $B_m$, $B_q$, C, $D_m$, and $D_q$, are coefficients that depend at least in part on turbine operational data measurements and/the atmospheric condition measurements represented by a scheduling vector θ. Scheduling variable θ is a vector of quantities representative of current operating conditions of the wind turbine, which depend in part on turbine operational data measurements and optionally atmospheric condition measurements. Vectors d and e are offset values, also dependent on scheduling variables. A scheduling vector θ can be continuous (i.e. wind speed, rotor speed), discrete or logical (i.e. if power-≥nominal power, if individual pitch control=on).

Examples of mathematical model formulations utilized for the wind observation model are, but not limited to, linear parameter varying systems, neural networks, regression trees, and non-linear black-box models. The parameters of the wind observation model are preferably obtained via data-driven system identification, either from data collected during measurements or from aeroelastic simulations. The measurements follow standard wind energy practices similar to the ones adopted in power curve certification.

Based upon the wind observation model, CPU 215 is configured to generate real-time estimates of at least one wind inflow parameter, including, but not limited to, estimates of yaw misalignment, up-flow, vertical shear, horizontal shear, turbulence intensity, veer, wind profile, waked state, and non-waked. The wind observation model estimates the at least one wind inflow parameter based on the input vector $\overline{m}$, as described above.

CPU 215 is further configured to generate at least one wind turbine regulation device command signal from the at least one wind inflow parameter. CPU 215 is further configured to transmit the at least one wind turbine regulation device command signal to wind turbine regulation device 250. Wind turbine regulation device 250 is configured to receive the at least one wind turbine regulation device command signal to regulate operation of wind turbine 300. Wind turbine regulation device 250 includes, but is not limited to, a pitch regulator to adjust blade pitch, a torque regulator to modulate torque in a drive train, a yaw regulator to modify a yaw position of wind turbine 300, and a mechanical brake regulator to engage a braking device for the drive train. The wind turbine regulation device command signal is based upon the at least one wind inflow parameter. Regulating the operation of wind turbine 300 includes, but is not limited to, controlling the yaw of wind turbine 300, controlling the pitch of at least one of the turbine blades (not shown in FIG. 2), controlling the power electronic converters connected to the turbine generator, controlling the power generated by wind turbine 300, controlling the rotational speed of the turbine rotor, and controlling the torque of wind turbine 300. For example, the wind turbine regulation device command signal commands the wind turbine regulation device to change the pitch of one or more rotor blade to enhance the torque or lower the loads in particular atmospheric conditions.

In some embodiments, CPU 215 is configured to directly transmit the wind turbine regulation device command signal to the wind turbine regulation device to regulate operation of wind turbine 300.

Moreover, wind turbine control system 200 described herein facilitates enhanced control of wind turbine 300 and/or a plurality of wind turbines 300 in a wind turbine park. Specifically, the embodiments described herein facilitate enhanced control of the wind turbine through determinations of real-time, day-to-day, and seasonal estimates of wind flow in a wind turbine site. As such, the embodiments described herein facilitate enhancing power generation performance and increasing annual energy production (AEP) by taking into account the time-dependent inflow variables such as wind turbine configuration changes including turbine outages and blade contamination and erosion.

Figure 3:
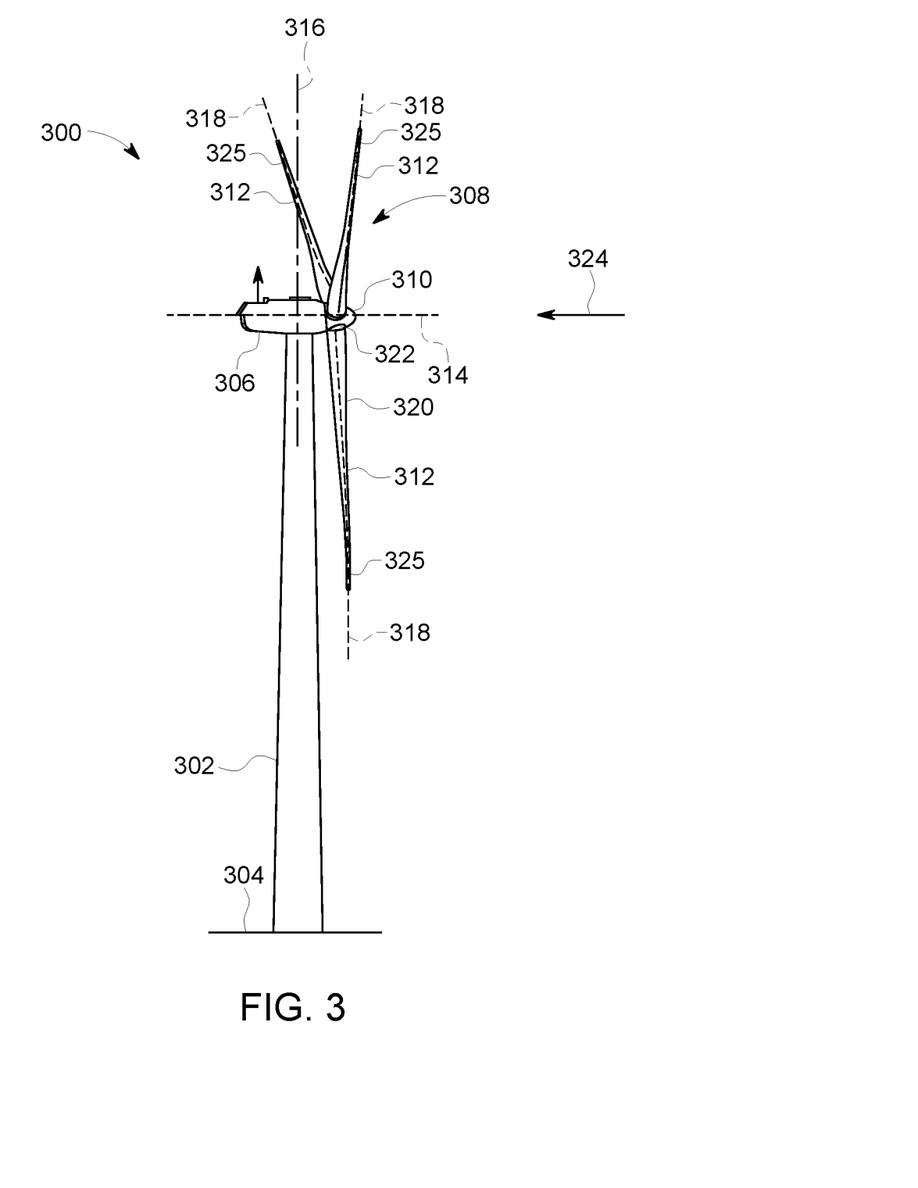
FIG. 3 is a schematic view of an exemplary wind turbine that is regulated through the wind turbine control system shown in FIG. 2.

FIG. 3 is a schematic view of an exemplary wind turbine 300 that is monitored and controlled through wind turbine control system 200 (shown in FIG. 2). In the exemplary embodiment, wind turbine 300 is a horizontal axis wind turbine. Wind turbine 300 includes a tower 302 extending from a supporting surface 304, a nacelle 306 coupled to tower 302, and a rotor 308 coupled to nacelle 306. Rotor 308 has a rotatable hub 310 and a plurality of rotor blades 312 coupled to hub 310. In the exemplary embodiment, rotor 308 has three rotor blades 312. Alternatively, rotor 308 has any number of rotor blades 312 that enables wind turbine 300 to function as described herein. In the exemplary embodiment, tower 302 is fabricated from tubular steel and has a cavity (not shown in FIG. 3) extending between supporting surface 304 and nacelle 306. Alternatively, tower 302 is any tower that enables wind turbine 300 to function as described herein including, but not limited to, a lattice tower. The height of tower 302 is any value that enables wind turbine 300 to function as described herein.

Blades 312 are positioned about rotor hub 310 to facilitate rotating rotor 308, thereby transferring kinetic energy from wind 324 into usable mechanical energy, and subsequently, electrical energy. Rotor 308 and nacelle 306 are rotated about tower 302 on a yaw axis 316 to control the perspective of blades 312 with respect to the direction of wind 324. Blades 312 are mated to hub 310 by coupling a blade root portion 320 to hub 310 at a plurality of load transfer regions 322. Load transfer regions 322 have a hub load transfer region and a blade load transfer region (both not shown in FIG. 3). Loads induced in blades 312 are transferred to hub 310 via load transfer regions 322. Each of blades 312 also includes a blade tip portion 325.

In the exemplary embodiment, blades 312 have a length between 50 meters (m) (164 feet (ft)) and 100 m (328 ft), however these parameters form no limitations to the instant disclosure. Alternatively, blades 312 have any length that enable wind turbine to function as described herein. As wind 324 strikes each of blades 312, aerodynamic forces (not shown) are induced on each of blades 312 and rotation of rotor 308 about rotation axis 314 is induced as blade tip portions 325 are accelerated. A pitch position, or pitch angle (not shown) of blades 312, i.e., an angle that determines each of blades' 312 orientation with respect to the rotor plane, is changed by a pitch adjustment mechanism (not shown in FIG. 3). Specifically, increasing a pitch angle of blade 312 pitches to feather.

Further, in FIG. 3, reference numeral 324 is generally representative of wind. Since wind 324 is distributed spatially and temporally, wind speed varies significantly at different points over the area swept by wind turbine blades 312. Therefore, different portions of wind turbine 300 experience different wind speeds. The pitch angles of blades 312 are adjusted about a pitch axis 318 for each of blades 312. In the exemplary embodiment, the pitch angles of blades 312 are controlled individually. Alternatively, blades' 312 pitch is controlled as a group. Still further alternatively, the pitch of the blades are modulated.

Figure 4:
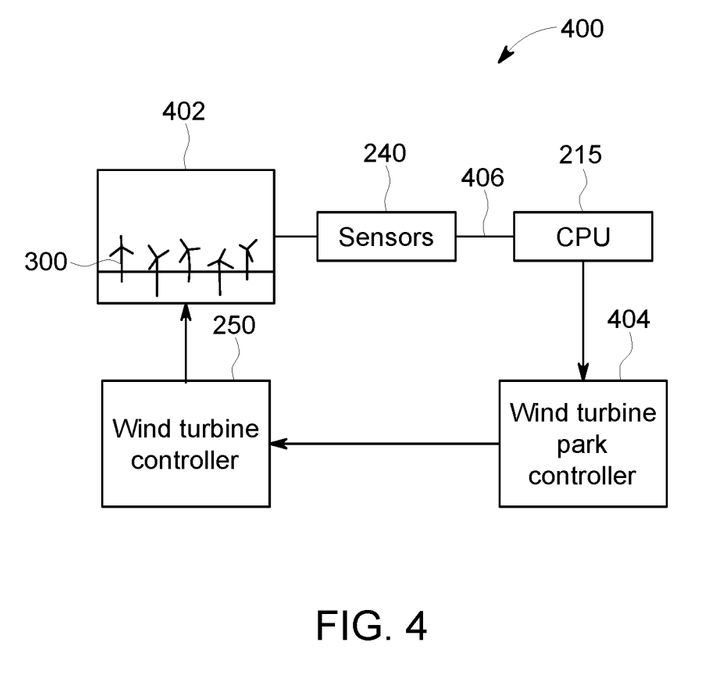
FIG. 4 is a schematic view of an exemplary wind turbine park control system that is used to regulate a plurality of wind turbines shown in FIG. 3.

FIG. 4 is a schematic view of an exemplary wind turbine park control system 400. In the exemplary embodiment, system 400 includes sensors 240 located proximate to, in, within, on, or otherwise attached to, at least one stationary component of at least one wind turbine 300 in wind turbine park 402. System 400 includes wind turbine control system 200. Alternatively, wind turbine control system 400 is a portion of any other system or systems regardless of the architecture of wind turbine control system 200.

In the exemplary embodiment, wind turbine park control system 400 includes wind turbine park regulation device 404 and a plurality of wind turbine regulation devices 250 coupled to wind turbine park regulation device 404. Sensors 240 are coupled to CPU 215 through a network 406 or data transmission cable 406. Park regulation device 404 primarily controls each wind turbine 300 in wind turbine park 402 through wind turbine regulation devices 250 as a function of wind inflow for one or more wind turbines 300 based on analyses by CPU 215, including regulating the angular rotor speed (revolutions per minute, i.e., rpm) and pitch angles of blades 312 about pitch axis 318 (both shown in FIG. 3). CPU 215 is configured to generate and transmit at least one wind turbine regulation device command signal to park regulation device 404. Park regulation device 404 transmits the wind turbine regulation device command signal to regulation devices 250 to regulate operation of wind turbines 300 in wind turbine park 402.

In an alternative embodiment, wind turbine park control system 400 does not include wind turbine park regulation device 404 and CPU 215 communicates directly with wind turbine regulation devices 250.

Figure 5:
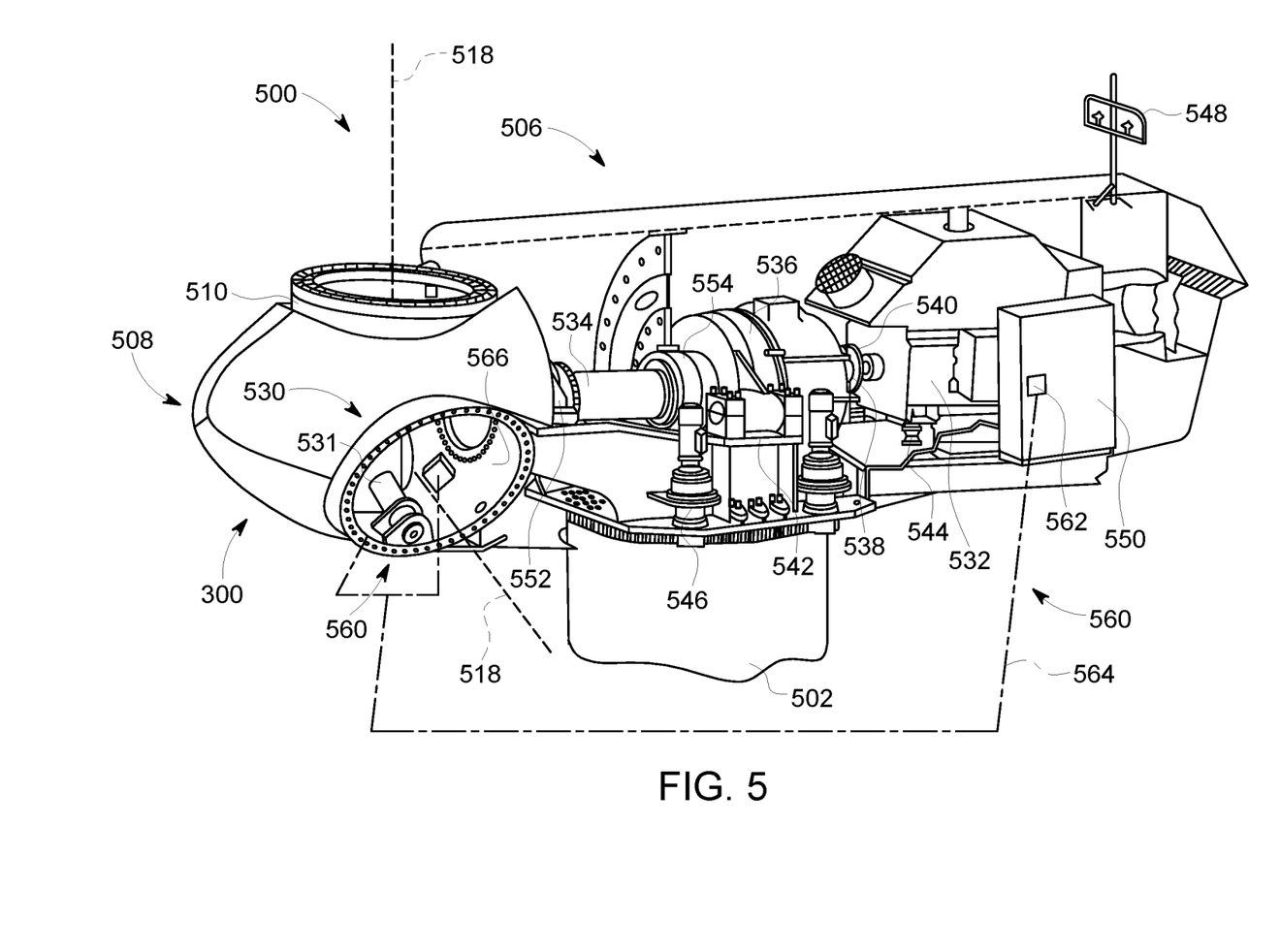
FIG. 5 is a cross-sectional schematic view of a nacelle of the wind turbine shown in FIG. 3.

FIG. 5 is a cross-sectional schematic view of nacelle 506 of exemplary wind turbine 300. Various components of wind turbine 300 are housed in nacelle 506 atop tower 502 of wind turbine 300. Nacelle 506 includes one pitch drive mechanism 530 that is coupled to one blade 312 (shown in FIG. 3), where mechanism 530 modulates the pitch of associated blade 312 along pitch axis 518. In the exemplary embodiment, the pitch drive mechanism 530 includes at least one pitch drive motor 531.

Nacelle 506 also includes a rotor 508 that is rotatably coupled to an electric generator 532 positioned within nacelle 506 via rotor shaft 534, a gearbox 536, a high speed shaft 538, and a coupling 540. Rotation of shaft 534 rotatably drives gearbox 536 that subsequently rotatably drives shaft 538. Shaft 538 rotatably drives generator 532 via coupling 540 and shaft 538 rotation facilitates generator 532 production of electrical power. Gearbox 536 and generator 532 are supported by supports 542 and 544, respectively. In the exemplary embodiment, gearbox 536 utilizes a dual path geometry to drive high speed shaft 538. Alternatively, main rotor shaft 534 is coupled directly to generator 532 via coupling 540.

Nacelle 506 further includes a yaw adjustment mechanism 546 that is used to rotate nacelle 506 and rotor 508 on an axis to control the perspective of blades 312 with respect to the direction of the wind. Nacelle 506 also includes at least one meteorological mast 548, where mast 548 includes a wind vane and anemometer. Mast 548 provides information to a turbine control system (not shown) that includes wind direction and/or wind speed.

A portion of the turbine control system resides within a control panel 550. Nacelle 506 further includes forward and aft support bearings 552 and 554, respectively, where bearings 552 and 554 facilitate radial support and alignment of shaft 534.

Wind turbine 300 includes a pitch control system 560, where at least a portion of pitch control system 560 is positioned in nacelle 506, or alternatively, outside nacelle 506. Specifically, at least a portion of pitch control system 560 described herein includes at least one wind turbine regulation device, i.e., processor 562 and a memory device (not shown), and at least one input/output (I/O) conduit 564, where conduit 564 includes at least one I/O channel (not shown). More specifically, processor 562 is positioned within control panel 550. In some embodiments, processor 562 is substantially similar to, or includes, processor 115 (shown in FIG. 1).

Processor 562 and other processors (not shown) as described herein process information transmitted from a plurality of electrical and electronic devices that includes, but not be limited to, blade pitch position feedback devices 566 (described further below) and electric power generation feedback devices (not shown). RAM and storage devices (not shown) store and transfer information and instructions to be executed by processor 562. RAM and storage devices can also be used to store and provide temporary variables, static (i.e., non-changing) information and instructions, or other intermediate information to processor 562 during execution of instructions by processor 562. Instructions that are executed include, but are not limited to, resident blade pitch system control commands. The execution of sequences of instructions is not limited to any specific combination of hardware circuitry and software instructions.

In the exemplary embodiment, at least a portion of pitch control system 560 including, but not limited to, processor 562 is positioned within control panel 550. Moreover, processor 562 is coupled to blade pitch drive motors 531 via at least one I/O conduit 564. I/O conduit 564 includes any number of channels having any architecture including, but not limited to, Cat 5/6 cable, twisted pair wiring, and wireless communication features. Pitch control system 560 includes distributed and/or centralized control architectures, or any combination thereof.

Pitch control system 560 also includes a plurality of independent blade pitch position feedback devices 566 coupled with processor 562 via at least one I/O conduit 564. In the exemplary embodiment, each pitch drive mechanism 530 is associated with a single blade pitch position feedback device 566 (also known as a blade pitch position device or a position feedback device). Alternatively, any number of blade pitch position feedback devices 566 are associated with each mechanism 530. Therefore, in the exemplary embodiment, mechanism 530 and associated drive motor 531, as well as device 566, are included in system 560 as described herein. Each blade pitch position feedback device 566 measures a pitch position of each blade 312 with respect to rotor hub 510. Blade pitch position feedback device 566 is any suitable sensor having any suitable location within or remote to wind turbine 300, such as, but not limited to, optical angle encoders, magnetic rotary encoders, and incremental encoders, or some combination thereof. Moreover, blade pitch position feedback device 566 transmits pitch measurement signals (not shown) that are substantially representative of associated blade 312 pitch position to processor 562 for processing thereof.

Figure 6:
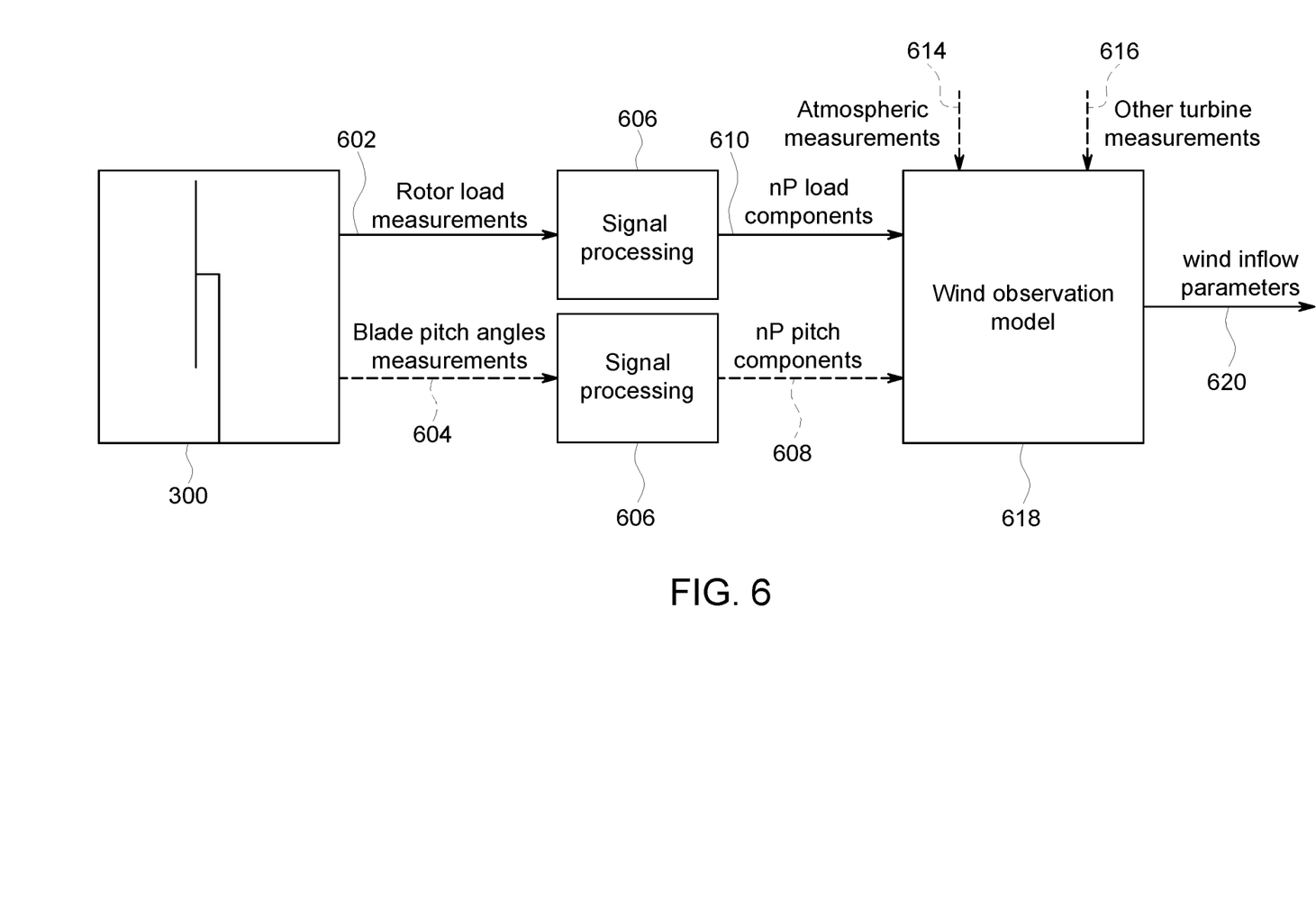
FIG. 6 is a schematic view of an exemplary method to generate wind inflow parameters to regulate the operation of the wind turbine shown in FIG. 3.

FIG. 6 is a schematic view of generating wind inflow parameters 620 using a wind observation model 618. Monitoring sensors on exemplary wind turbine 300 transmit rotor load measurement sensor signals 602 and blade pitch angle measurement sensor signals 604 to the WOM (wind observation modeling) computing device (not shown). Rotor load measurements and blade pitch angle measurements are processed (signal processing 606), as explained above, into nP load components 610 and nP blade pitch angle components 608.

Atmospheric condition measurements 614 and turbine operational data measurements 616 are also transmitted to the WOM computing device. The WOM computing device uses one or more of atmospheric condition measurements 614, turbine operational data measurements 616, nP load components 610, and nP blade pitch angle components 608 to generate wind observation model 618. The WOM computing device uses the wind observation model to generate wind inflow parameters 620. The WOM computing device transmits a command signal, based upon wind inflow parameters 620, to the wind turbine regulation device (not shown) to regulate the wind turbine.

The above described wind turbine control system for a wind turbine includes at least one mechanical load measurement sensor, at least one wind turbine regulation device, and at least one wind observation modeling (WOM) computing device. The wind turbine includes at least one stationary component. The mechanical load measurement sensor is coupled to the stationary component. The WOM computing device is coupled to the mechanical load measurement sensor and the wind turbine regulation device. The WOM computing device is configured to receive at least one mechanical load measurement signal from the mechanical load measurement sensor. The WOM computing device is configured to generate at least one wind inflow parameter using the mechanical load measurement signal. The WOM computing device is further configured to generate at least one wind turbine regulation device command signal based on the wind inflow parameter. The WOM computing device is still further configured to transmit the wind turbine regulation device command signal to the wind turbine regulation device to regulate operation of the wind turbine based upon the wind inflow parameter.

An exemplary technical effect of the methods, systems, and apparatus described herein includes at least one of: (a) real-time knowledge of the inflow conditions on a wind turbine site is used in control strategies for one or more of the following: enhancing power generation performance, increasing annual energy production (AEP), reducing mechanical loads, and reducing noise; (b) increasing the accuracy in predicting the power performance, loads and noise of wind turbines under different inflow conditions; (c) predicting turbine wake length and strength more accurately, enabling better wind farm control; and (d) enabling enhanced discrimination between disturbed and non-disturbed sound pressures facilitates using smaller margins to regulatory parameters, thereby further enhancing power generation.

Exemplary embodiments of methods and systems for monitoring and controlling wind turbines are not limited to the specific embodiments described herein, but rather, components of systems and/or steps of the methods may be utilized independently and separately from other components and/or steps described herein. For example, the methods may also be used in combination with other wind turbine systems requiring in-situ recognition of wind inflow conditions and are not limited to practice with only the wind turbines and methods as described herein. Rather, the exemplary embodiment can be implemented and utilized in connection with many other applications, equipment, and systems that may benefit from physics-based modeling and control in an operating environment with wind inflow conditions.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a wind turbine, the wind turbine including at least one stationary component, said control system comprising:
    at least one mechanical load measurement sensor mounted to the at least one stationary component, the at least one stationary component comprising a yaw bearing;
    at least one blade pitch angle sensor to generate at least one blade pitch angle signal;
    at least one wind turbine regulation device configured to regulate operation of the wind turbine as a function of at least one wind inflow parameter; and
    at least one modeling device coupled to said at least one mechanical load measurement sensor, said at least one blade pitch angle sensor, and said at least one wind turbine regulation device, said at least one modeling device configured to:
        receive at least one mechanical load measurement signal from said at least one mechanical load measurement sensor coupled to the at least one stationary component and said at least one blade pitch angle signal from the at least one blade pitch angle sensor, wherein the at least one mechanical load measurement signal comprises a nodding moment and a yawing moment measurement;
        generate per-rotor revolution (nP) harmonic load components and per-rotor revolution (nP) harmonic pitch angle components from the at least one mechanical load measurement signal and the at least one blade pitch angle signal, respectively;
        relate the per-rotor revolution (nP) harmonic load components and per-rotor revolution (nP) harmonic pitch angle components stacked in an input vector to the at least one wind inflow parameter contained in an output vector via the following:

$$\dot{\bar{x}}=A(\theta)\bar{x}+B_m(\theta)\bar{m}+B_q(\theta)q+d(\theta)$$

$$\varphi=C(\theta)\bar{x}+D_m(\theta)\bar{m}+D_q(\theta)q+e(\theta)$$

generate the at least one wind inflow parameter based on the per-rotor revolution (nP) harmonic load components and per-rotor revolution (nP) harmonic pitch angle components, wherein the at least one wind inflow parameter includes estimates of yaw misalignment, up-flow, vertical shear, horizontal shear, turbulence intensity, veer, and wind profile;
        generate at least one wind turbine regulation device command signal based on the at least one wind inflow parameter; and
        regulate operation of the wind turbine based on the at least one wind turbine regulation device command signal.

2. The control system in accordance with claim 1, wherein said at least one mechanical load measurement sensor is coupled to one or more of a shaft flange, a rotor hub, or a rotor shaft.

3. The control system in accordance with claim 1, wherein said control system further comprises at least one wind turbine operational data sensor coupled to said at least one modeling device, said at least one modeling device further configured to:
    receive at least one wind turbine operational data signal from said at least one wind turbine operational data sensor; and generate the at least one wind inflow parameter based on the at least one wind turbine operational data signal.

4. The control system in accordance with claim 1, wherein said control system further comprises at least one atmospheric condition measurement sensor coupled to said at least one modeling device, said at least one modeling device further configured to:
receive at least one atmospheric condition measurement signal from said at least one atmospheric condition measurement sensor; and
generate the at least one wind inflow parameter based on the at least one atmospheric condition measurement signal.

5. The control system in accordance with claim 1, wherein the wind turbine includes a shaft flange, said at least one mechanical load measurement sensor configured to measure displacement of the shaft flange.

6. The control system in accordance with claim 1, wherein the wind turbine includes a shaft flange, said at least one mechanical load measurement sensor configured to measure a strain of the shaft flange.

7. The control system in accordance with claim 1, wherein the wind turbine includes a tower and a tower top, said at least one mechanical load measurement sensor configured to measure bending of the tower top.

8. The control system in accordance with claim 1, wherein said at least one modeling device is further configured to generate, based upon the at least one mechanical load measurement signal, one or more estimates of wind inflow parameters, including, but not limited to, yaw misalignment, up-flow, vertical shear, horizontal shear, wind profile, veer, turbulence intensity, a waked state, and a non-waked state.

9. A method for controlling a wind turbine, the wind turbine including at least one stationary component, the at least one stationary component comprising a yaw bearing, at least one mechanical load measurement sensor mounted to the at least one stationary component, at least one blade pitch angle sensor, at least one wind turbine regulation device, and at least one modeling device coupled to the at least one mechanical load measurement sensor, said at least one blade pitch angle sensor and the at least one wind turbine regulation device, said method comprising:
receiving, by the modeling device, at least one mechanical load measurement signal from the at least one mechanical load measurement sensor, wherein the at least one mechanical load measurement signal comprises a nodding moment and a yawing moment measurement;
receiving, by the modeling device, at least one blade pitch angle signal from the at least one blade pitch angle sensor;
generating per-rotor revolution (nP) harmonic load components and per-rotor revolution (nP) harmonic pitch angle components from the at least one mechanical load measurement signal and the at least one blade pitch angle signal, respectively;
relating, by the modeling device, the per-rotor revolution (nP) harmonic load components and per-rotor revolution (nP) harmonic pitch angle components stacked in an input vector to the at least one wind inflow parameter contained in an output vector via the following:

$$\dot{\bar{x}} = A(\theta)\bar{x} + B_m(\theta)\bar{m} + B_q(\theta)q + d(\theta)$$

$$\varphi = C(\theta)\bar{x} + D_m(\theta)\bar{m} + D_q(\theta)q + e(\theta)$$

generating, by the modeling device, at least one wind inflow parameter based on the per-rotor revolution (nP) harmonic load components and per-rotor revolution (nP) harmonic pitch angle components, wherein the at least one wind inflow parameter includes estimates of yaw misalignment, up-flow, vertical shear, horizontal shear, turbulence intensity, veer, and wind profile;
generating, by the modeling device, at least one wind turbine regulation device command signal based on the at least one wind inflow parameter; and
regulating operation of the wind turbine based on the at least one wind turbine regulation device command signal.

10. The method in accordance with claim 9, wherein said at least one mechanical load measurement sensor is coupled to one or more of a shaft flange, a rotor hub, or a rotor shaft.

11. The method in accordance with claim 9, wherein the at least one modeling device is coupled to at least one wind turbine operational data sensor, said method further comprising:
receiving, by the modeling device, at least one wind turbine operational data signal from the at least one wind turbine operational data sensor; and
generating, by the modeling device, the at least one wind inflow parameter based on the at least one wind turbine operational data signal.

12. The method in accordance with claim 9, wherein the at least one modeling device is coupled to at least one atmospheric condition measurement sensor, said method further comprising:
receiving, by the modeling device, at least one atmospheric condition measurement signal from the at least one atmospheric condition measurement sensor; and
generating, by the modeling device, the at least one wind inflow parameter based on the at least one atmospheric condition measurement signal.

13. The method in accordance with claim 9, further comprising generating, by the modeling device, based upon the at least one mechanical load measurement signal, one or more estimates of wind inflow parameters, including, but not limited to, yaw misalignment, up-flow, vertical shear, horizontal shear, wind profile, veer, turbulence intensity, a waked state, and a non-waked state.

14. A wind turbine park comprising:
a plurality of wind turbines comprising an operating wind turbine, wherein at least one wind turbine includes at least one stationary component, the at least one stationary component comprising a yaw bearing;
at least one mechanical load measurement sensor mounted to the at least one stationary component;
at least one blade pitch angle sensor to generate at least one blade pitch angle signal;
at least one wind turbine regulation device configured to regulate operation of the at least one wind turbine as a function of at least one wind inflow parameter; and
at least one modeling device coupled to said at least one mechanical load measurement sensor, said at least one blade pitch angle sensor and said at least one wind turbine regulation device, said at least one modeling device configured to:
receive at least one mechanical load measurement signal from said at least one mechanical load measurement sensor and the at least one blade pitch angle signal from the at least one blade pitch angle sensor, wherein the at least one mechanical load measurement signal comprises a nodding moment and a yawing moment measurement;
generate per-rotor revolution (nP) harmonic load components and per-rotor revolution (nP) harmonic pitch angle components from the at least one mechanical load measurement signal and the at least one blade pitch angle signal, respectively;

relate the per-rotor revolution (nP) harmonic load components and per-rotor revolution (nP) harmonic pitch angle components stacked in an input vector to the at least one wind inflow parameter contained in an output vector via the following:

$$\bar{\dot{x}} = A(\theta)\bar{x} + B_m(\theta)\bar{m} + B_q(\theta)q + d(\theta)$$

$$\varphi = C(\theta)\bar{x} + D_m(\theta)\bar{m} + D_q(\theta)q + e(\theta)$$

generate the at least one wind inflow parameter based on the per-rotor revolution (nP) harmonic load components and per-rotor revolution (nP) harmonic pitch angle components, wherein the at least one wind inflow parameter includes estimates of yaw misalignment, up-flow, vertical shear, horizontal shear, turbulence intensity, veer, and wind profile;

generate at least one wind turbine regulation device command signal based on the at least one wind inflow parameter; and regulate operation of said wind turbine park based on the at least one wind turbine regulation device command signal.

15. The wind turbine park in accordance with claim 14, wherein said wind turbine park further comprises at least one wind turbine operational data sensor coupled to said at least one modeling device, said at least one modeling device further configured to:

receive at least one wind turbine operational data signal from said at least one wind turbine operational data sensor; and generate the at least one wind inflow parameter based on the at least one wind turbine operational data signal.

16. The wind turbine park in accordance with claim 14, wherein said wind turbine park further comprises at least one atmospheric condition measurement sensor coupled to said at least one modeling device, said at least one modeling device further configured to:

receive at least one atmospheric condition measurement signal from said at least one atmospheric condition measurement sensor; and generate the at least one wind inflow parameter based on the at least one atmospheric condition measurement signal.

17. The wind turbine park in accordance with claim 14, wherein said at least one mechanical load measurement sensor is coupled to one or more of a shaft flange, a rotor hub, or-a rotor shaft.

18. The wind turbine park in accordance with claim 14, wherein said modeling device is further configured to generate, based upon the at least one mechanical load measurement signal, one or more estimates of wind inflow parameters, including, but not limited to, yaw misalignment, up-flow, vertical shear, horizontal shear, wind profile, veer, turbulence intensity, a waked state, and a non-waked state.

* * * * *